July 5, 1949.　　　E. C. HENDRICKSON　　　2,475,283

MULTIPLEX BEVEL GEARING

Filed April 16, 1945

Inventor

Ellis C. Hendrickson

By Reynolds & Beach

Attorneys

Patented July 5, 1949

2,475,283

UNITED STATES PATENT OFFICE 2,475,283

MULTIPLEX BEVEL GEARING

Ellis C. Hendrickson, Seattle, Wash., assignor to Kurt F. J. Kirsten, Seattle, Wash.

Application April 16, 1945, Serial No. 588,473

4 Claims. (Cl. 74—410)

It has been proposed to employ multiplex bevel gear trains for transmitting large amounts of power between shafts disposed angularly relative to each other. Such a multiplex drive is disclosed in the United States patent of Kurt F. J. Kirsten, No. 2,418,555, issued April 8, 1947, entitled Multiplex bevel gearing. Bevel gearing having a cone angle other than 45° to effect a speed reduction between two shafts in mutually perpendicular arrangement is frequently used. It is not necessary, of course, that the angle between the elements interconnected by the bevel gearing be 90°.

Where multiplex bevel gearing is employed as a drive connection between two rotative elements it is important that provision be made for distributing the load between the different sets of bevel gears so that the tooth pressure will be substantially uniform over the entire composite length of the bevel gear sets. Equalization of the load may be effected by the mechanism disclosed in the aforesaid Kirsten application incorporating a balancing lever bar arrangement interconnecting various sets of bevel gears so that the gears of one coaxial gear group may shift circumferentially relative to each other.

It is the principal object of my invention to eliminate the necessity of providing a balancing lever bar arrangement in duplex bevel gear trains, that is, in bevel gearing having only two pinion and gear sets. In multiplex gearing having more than two pinion and gear sets it may still be necessary to have some type of balancing lever bar arrangement of the general type disclosed in the Kirsten patent application mentioned above, but even then the construction can be simplified by the use of my invention.

More specifically, it is an object to achieve the desired results by enabling gears of a coaxial gear group to shift lengthwise of their rotative axes instead of circumferentially relative to each other. Such expedient is particularly advantageous for gearing of the spiral bevel type in which two gears, the teeth of which follow oppositely directed spirals, are positively interconnected for conjoint axial adjustment to alter differentially the engagement of such gears.

An additional object is to minimize the degree of axial gear shift required to equalize the distribution of the tooth pressure by assembling the gears initially in approximately the proper relationship, and then effecting slight axial displacement of a gear group for final adjustment of the gears.

My gearing arrangement will have the same advantages of compactness and power transmitting ability as the multiplex gearing disclosed in the Kirsten patent application mentioned, although its construction will be less complicated, particularly for duplex bevel gearing, and consequently it will be more economical to manufacture.

Additional features of the preferred embodiment of my invention illustrated in the drawings will be described hereafter.

Figure 1:
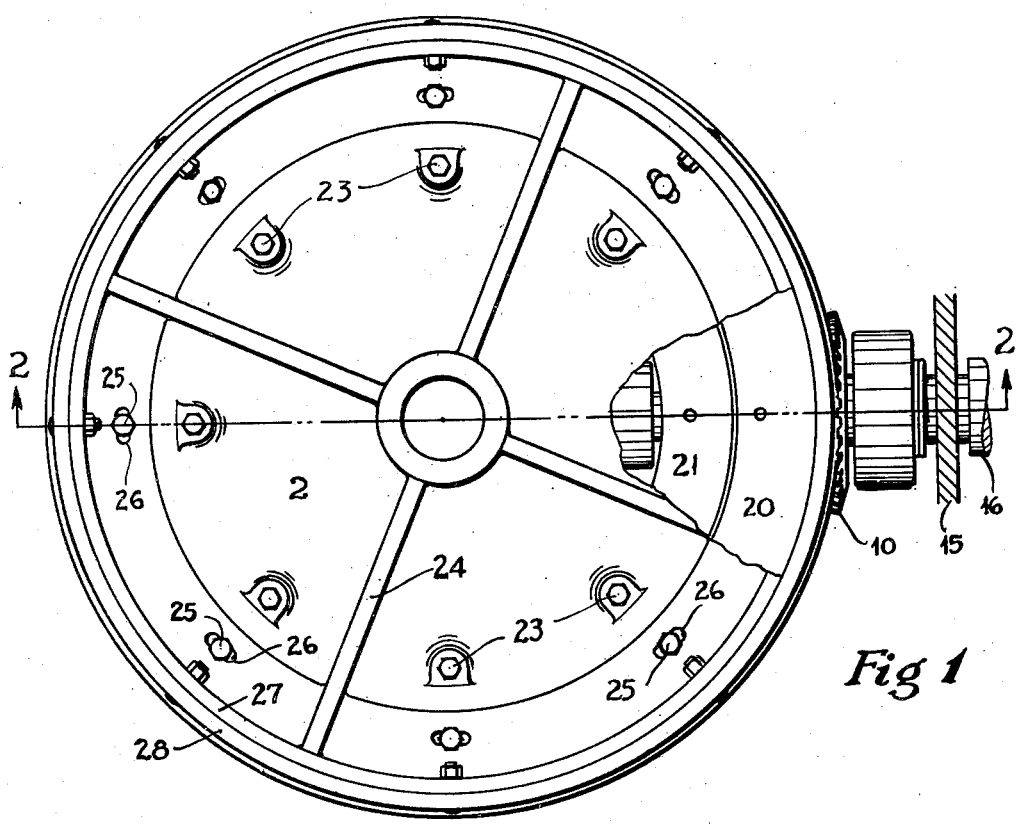
Figure 1 is a plan view of representative duplex bevel gearing incorporating my invention.
Figure 2:
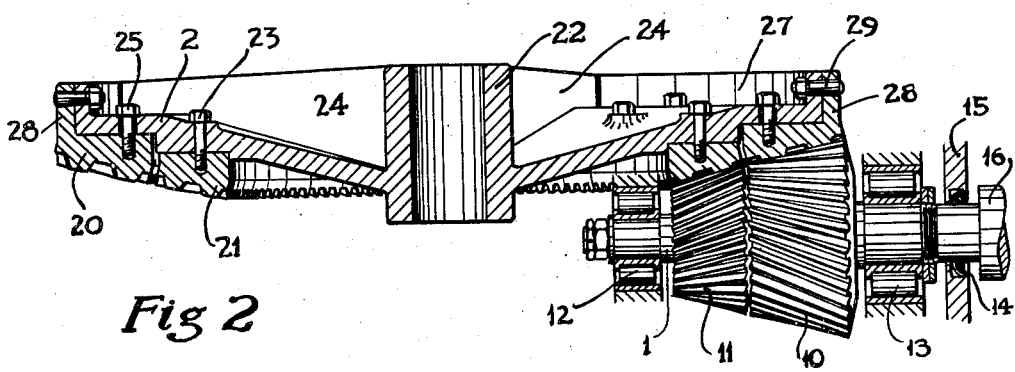
Figure 2 is sectional view through such bevel gearing taken along 2—2 of Figure 1, showing the pinions in elevation.

The cone angle of the bevel gearing in the drawing is considerably less than 45°, effecting a drive ratio of about four to one. For some installations it is desirable to use even a greater movement ratio, for example, six or six and one-half to one.

The duplex drive illustrated includes two gear and pinion sets, the outer set being composed of the pinion 10 carried by the shaft 1 and meshing with the gear 20 on the mounting plate 2. The inner bevel gear set includes the pinion 11, also on the shaft 1, which meshes with gear 21, carried by mounting plate 2. The pinions 10 and 11 are arranged coaxially, to form a gear group, and the gears 20 and 21 are also coaxial, making a second gear group.

While it is theoretically possible to cut pinions 10 and 11 directly on shaft 1, it is more convenient to machine these pinions as separate units and then to secure them rigidly on such shaft to compose an integral assembly. For the purposes of my invention, each of these pinions is preferably of the spiral type, their teeth being convoluted in opposite directions so that the inner ends of the teeth on outer pinion 10 and the outer ends of the teeth on inner pinion 11 will either lead or trail the other ends of the respective teeth in the direction of rotation, depending upon the sense in which shaft 1 is rotated.

The teeth of gears 20 and 21 are also of spiral conformation, complemental to the teeth of pinions 10 and 11, respectively. It is desirable that these gears likewise be cut as separate units and then mounted on backing plate 2. Gear 21 may thus constitute a ring having a planar back perpendicular to its axis. The back of this gear may engage contiguously a face of the mounting plate perpendicular to its hub 22, and the gear may be secured in this position by machine screws 23 passing through the plate and threaded into tapped holes in the back of the gear. In Figure 1 eight of these securing screws are shown, located intermediate stiffening ribs 24 of the mounting plate. The number of such screws, or equivalent securing elements, employed may be varied in accordance with the load to be carried.

It is important that gears 20 and 21 be secured to their mounting plates 2 in relative positions corresponding to the positions of pinions 10 and 11 on shaft 1, so that the teeth of the gears in both gear sets will be in proper mesh. If pinions 10 and 11 are first secured on shaft 1 it is necessary to mount the gears 20 and 21 correspondingly on plate 2. One of these gears, for example gear 21, may be attached to the plate in any circumferential position. When gear 20 is assembled with the mounting plate and gear 21, however, its disposition must be governed by the previously established relationship of the two pinions. For that reason provision is made for shifting gear 20 circumferentially relative to plate 2 and gear 21 during the procedure of mounting it.

Like the arrangement for securing together gear 21 and mounting plate 2, gear 20 may be attached to the mounting plate in a preliminary fashion by machine screws 25 passing through the mounting plate and screwed into tapped holes in the back of the gear ring when its planar back seats against the plate surface provided for engagement by the gear. While screws 23 fit snugly in holes in the backing plate to locate inner gear ring 21 in a definite circumferential position, however, the machine screws 25 pass through slots 26 in the plate. These screws can therefore be slid along such slots as gear 20 is shifted circumferentially over a reasonable range. Such movement will be sufficient to enable the relative positions of gears 20 and 21 to be synchronized with the arrangement of pinions 10 and 11.

In assembling the gearing pinion shaft 1 carrying pinions 10 and 11 may be held rigidly so that it can neither move endwise nor rotate. Gear 21, secured rigidly to plate 2 by screws 23, can then be placed in mesh with pinion 11, machine screws 25 being left slightly loose to enable gear ring 20 to be shifted circumferentially relative to the plate. With this plate supported for rotation and located accurately for exact registry of gears 20 and 21 radially with pinions 10 and 11, respectively, gear 20 may be shifted circumferentially of its mounting plate until its teeth mesh with the teeth of pinion 10. During such adjustment screws 25 will, of course, be shifted to a greater or lesser degree along slots 26. By rotating plate 2 slightly gear 20 may thus be adjusted so that teeth of both gears contact teeth of their respective pinions substantially simultaneously.

With the position of gear 20 thus established relative to its mounting plate 2 the screws 25 may be tightened to clamp the gear in such adjusted position. It is evident, however, that the frictional engagement of the screw heads with the surface of plate 2 could not hold the gear reliably against shifting circumferentially under load out of the adjusted position established. Consequently overlapping cylindrical flanges 27 and 28 are provided on mounting plate 2 and outer gear ring 20, respectively. These flanges are bored radially at intervals to receive pins 29 which secure gear 20 positively relative to plate 2 in the adjusted position established. Preferably the apertures in flanges 27 and 28 are tapered radially inwardly. The bodies of pins 29 are tapered complementally, and the inner ends of such pins may be threaded to receive nuts for drawing the pins firmly into the holes. The number of these pins employed may vary, but since they must transmit the torque between gear 20 and plate 2 several of them should be provided, eight being illustrated in the drawing.

When an approximate relationship between the selected circumferential location of the pinions 10 and 11 has thus been established with respect to a particular circumferential disposition of gears 20 and 21, the relative positions of the two gear groups should be marked so that when the gears and pinions are disengaged they may readily be assembled again at a later time in proper mesh.

Despite such initial adjustment it is very likely that sufficient inaccuracy in locating gear 20 relative to plate 2 will occur so that one or the other of the gear and pinion sets would carry most of the load, if a constant radial relationship of the respective gears and pinions is maintained. If the tooth pressure between pinion 11 and gear 21 were greater than that between pinion 10 and gear 20, however, and shaft 1 were rotating in a clockwise direction as viewed from its outer end, the pressure between the teeth of the inner gear set could be diminished and that between the teeth of the outer gear set increased by shifting the pinion shaft 1 slightly outward lengthwise, provided that the teeth of the two gear sets are directed along opposed spirals. If the same condition existed when shaft 1 was rotating in a counterclockwise direction a corresponding alteration in tooth loading could be effected by shifting shaft 1 lengthwise inwardly. In either instance the actual movement of shaft 1 would be very slight, the amount depending upon the extent of error in the location of gear 20 on plate 2 and the degree of inclination of the gear teeth spirally. The more pronounced the spiral the less would be the lengthwise shift of shaft 1 required to compensate for a given error in the setting of gear 20. In any event, however, there need be only very slight backlash between the gear teeth to provide sufficient clearance for the axial adjustment of the pinions lengthwise of their shaft substantially to equalize the loading on the teeth of both gear sets. Such shift would be so slight that the gear teeth would bear over practically their entire lengths.

As explained in the specification of Kirsten United States Patent No. 2,418,555, mentioned above, it is preferred that the tooth length of the component gears be approximately 25% of their cone's slant height. With such proportions the widths of pinion 10 and gear 20 would be substantially greater than the widths of pinion 11 and gear 21, and the load carried by the outer gear set would be correspondingly greater. Assuming that the tooth pressure is practically equalized over both sets of gears, therefore, it would be necessary for the teeth of the inner pinion and gear to be inclined spirally to a greater degree than the teeth of the outer pinion and gear in order to balance the thrust forces lengthwise of shaft 1. In my structure likewise the same considerations would apply in determining the spiral angles for the gear teeth of the respective gear sets.

It can be assumed, therefore, that the spiral inclinations of the teeth of the two gear sets will be selected such that the opposing thrust lengthwise of pinion shaft 1 will be balanced when the unit pressure on the teeth of both gear sets is the same. The converse will also be true; if the unit pressures on the teeth of the two gear sets are not equal, because of slightly inaccurate location of gear 20 circumferentially of mounting plate 2, the force component lengthwise of shaft 1 produced by the load on the gear set having the greater tooth pressure will exceed the force component lengthwise of such shaft created by the load on the gear set having the lesser tooth pressure. Such unequal force components lengthwise of shaft 1 will tend to shift the pinions axially to balance the thrust.

If lengthwise shaft movement is permitted the consequent shift of pinions 10 and 11 will decrease the load and tooth pressure on the gear set having the higher tooth pressure, and will increase correspondingly the tooth pressure, and consequently the load, on the gear set having the lower tooth pressure, until the tooth pressures on the two gear sets are substantially equalized, provided that the gears have been designed properly for that condition. When the net end thrust force on shaft 1 created by the non-uniform loading on the two gear sets is thus eliminated, the force acting to shift the shaft lengthwise will disappear and it will remain in such equilibrium position.

To accomplish the results desired, the importance of designing the teeth of the gear sets so that the thrust load axially of pinions 10 and 11 will be balanced when the tooth load is uniformly distributed over the composite width of the two pinions, or is distributed in some other desired manner, will be appreciated. I utilize this design feature in attaining the operation described by mounting the shaft 1 so that it may shift lengthwise until the thrust forces on it are in balance, which insures that the distribution of tooth pressure over the entire composite width of the gearing will be that for which the gearing was designed.

As an example of a suitable mounting for shaft 1 having these capabilities, a bearing 12, preferably of the anti-friction roller type, supports the inner end of the pinion shaft, and a similar bearing 13 supports the outer end of such shaft. In each instance the rollers may be retained by a flanged inner collar secured to the shaft. As shown in the drawings these bearing collars are held against shoulders on the shaft by the pressure of nuts screwed onto it, but any other suitable fastening arrangement may be used. The rollers are contained within an unflanged outer ring in each instance, which will enable them to move axially with the shaft, as it shifts lengthwise, by sliding on the outer ring, to balance the thrust forces produced by the two gear sets in the manner described. The outer rings of the bearings 12 and 13 may be supported in any convenient fashion from the structure supporting the gearing, depending upon the particular type of mechanism in which the gearing is to be used.

Since the gears should be lubricated, an oil seal 14 for shaft 1 may be provided in the gear casing 15, which is capable of accommodating the slight endwise movement of the shaft. A flexible coupling 16 may connect the pinion shaft to the driving or driven mechanism.

Factors to be considered in selecting the number of teeth for the gears of the two gearing sets, the widths of the gears, and other features of the design have been discussed in the Kirsten application which has been mentioned above, and since such features are not part of my particular improvement they need not be considered in detail here.

While my invention is of particular value in a duplex bevel gear drive, the same principles may be applied in a multiplex drive having a larger number of bevel gear sets. In that event, however, my construction may replace at least one lever bar of the Kirsten type of load balancing mechanism. The tooth pressure between two sets of bevel gears constructed in the manner described and an additional pinion and gear set or sets incorporated in multiplex gearing may be equalized by a balancing lever arrangement in conformity with the disclosure of the Kirsten application.

I claim as my invention:

1. Multiplex bevel gearing comprising two members rotative about axes disposed angularly relative to each other, two spiral bevel gears having their teeth convoluted in opposite directions, secured against relative rotation and carried by one of said rotative members, second two spiral bevel gears secured against relative rotation, having their teeth convoluted in opposite directions for meshing respectively with said first two bevel gears, the teeth of one of such second gears being shorter and more steeply inclined relative to its axis and the teeth of the other of such second gears being longer and less steeply inclined relative to its axis, and said second gears being carried by the other of said rotative members, and means supporting such other of said rotative members to enable shifting thereof and the gears carried thereby lengthwise of their rotative axis to increase the pressure between one of said second two bevel gears and the one of said first two bevel gears meshing therewith and correspondingly to decrease the pressure between the other of said second two bevel gears and the other of said first two bevel gears, thereby to effect equilibrium of the axial thrust between the two pairs of meshing gears.

2. Duplex bevel gearing comprising two members rotative about axes disposed angularly relative to each other, two spiral bevel gears having their teeth convoluted in opposite directions and carried by one of said rotative members, two spiral bevel gears having their teeth convoluted in opposite directions for meshing respectively with said first two bevel gears and integral with the other of said rotative members, adjustable means interposed between at least one of said first two bevel gears and the rotative member carrying it, for circumferential shifting of such bevel gear relative to its rotative member to effect approximate meshing of such shiftable gear with its cooperating gear at the same time that the other of said first two bevel gears is in driving contact with the one of said second two bevel gears in mesh therewith, and means supporting said rotative member integral with said second two bevel gears to enable shifting thereof and such gears as a unit lengthwise of the axis of such rotative member and relative to the other rotative member, to increase the pressure between one of said second two bevel gears and the one of said first two bevel gears meshing therewith and correspondingly to decrease the pressure between the other of said second two bevel gears and the other of said first two bevel gears, thereby to effect driving contact between both of said second two bevel gears and said first two bevel gears, respectively, the spiral angles of the teeth of the two bevel gears on each of said rotative members being selected to effect substantial equalization of the unit pressure between the two pairs of meshing bevel gears by such conjoint axial shifting of said second two bevel gears into an equilibrium position.

3. Duplex bevel gearing comprising two members rotative about axes disposed angularly relative to each other, two spiral bevel gears having their teeth convoluted in opposite directions and carried by one of said rotative members, two spiral bevel gears having their teeth convoluted in opposite directions for meshing respectively with said first two bevel gears and integral with the other of said rotative members, adjustable means interposed between at least one of said first two bevel gears and the rotative member carrying it, for circumferential shifting of such bevel gear relative to its rotative member to effect approximate meshing of such shiftable gear with its cooperating gear at the same time that the other of said first two bevel gears is in driving contact with the one of said second two bevel gears in mesh therewith, and means supporting said rotative member integral with said second two bevel gears to enable shifting thereof and such gears as a unit lengthwise of the axis of such rotative member and relative to the other rotative member, to increase the pressure between one of said second two bevel gears and the one of said first two bevel gears meshing therewith and correspondingly to decrease the pressure between the other of said second two bevel gears and the other of said first two bevel gears, thereby to effect driving contact between both of said second two bevel gears and said first two bevel gears, respectively.

4. Multiplex bevel gearing comprising two members rotative about axes disposed angularly relative to each other, two spiral bevel gears having their teeth convoluted in opposite directions, secured against relative rotation and carried by one of said rotative members, second two spiral bevel gears secured against relative rotation, having their teeth convoluted in opposite directions for meshing respectively with said first two bevel gears, the teeth of the one of such second gears of smaller average diameter being shorter and more steeply inclined relative to its axis and the teeth of the one of such second gears of larger average diameter being longer and less steeply inclined relative to its axis, and said second gears being carried by the other of said rotative members, and means supporting such other of said rotative members to enable shifting thereof and the gears carried thereby lengthwise of their rotative axis to increase the pressure between one of said second two bevel gears and the one of said first two bevel gears meshing therewith and correspondingly to decrease the pressure between the other of said second two bevel gears and the other of said first two bevel gears, thereby to effect equilibrium of the axial thrust between the two pairs of meshing gears.

ELLIS C. HENDRICKSON.

REFERENCES CITED

The following references are of record in the file of this patent:

UNITED STATES PATENTS

| Number | Name | Date |
| --- | --- | --- |
| 1,143,617 | Ehrlich | June 22, 1915 |
| 1,273,556 | Warriner | July 23, 1918 |
| 1,678,582 | Allen | July 24, 1928 |
| 1,848,342 | Gleason | Mar. 8, 1932 |